United States Patent
Silverbrook (12)

(10) Patent No.: US 7,426,050 B2
(45) Date of Patent: Sep. 16, 2008

(54) MANUALLY OPERABLE PRINTER-SCANNER

(75) Inventor: Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 603 days.

(21) Appl. No.: 10/503,900

(22) PCT Filed: Feb. 2, 2003

(86) PCT No.: PCT/AU03/00150

§ 371 (c)(1),
(2), (4) Date: Aug. 9, 2004

(87) PCT Pub. No.: WO03/069890

PCT Pub. Date: Aug. 21, 2003

(65) Prior Publication Data

US 2005/0088683 A1   Apr. 28, 2005

(30) Foreign Application Priority Data

Feb. 13, 2002   (AU) .................................. PS0486

(51) Int. Cl.
*G06F 15/00* (2006.01)
*H04N 1/46* (2006.01)

(52) U.S. Cl. ..................................................... 358/1.15

(58) Field of Classification Search .................. None
See application file for complete search history.

(56) References Cited

U.S. PATENT DOCUMENTS

| 4,899,228 | A | | 2/1990 | Sano | |
|---|---|---|---|---|---|
| 5,306,908 | A | * | 4/1994 | McConica et al. | 250/234 |
| 5,847,836 | A | * | 12/1998 | Suzuki | 358/296 |
| 5,861,877 | A | * | 1/1999 | Kagayama et al. | 345/179 |
| 5,988,900 | A | | 11/1999 | Bobry | |
| 6,015,211 | A | | 1/2000 | Kinoshita et al. | |
| 6,092,941 | A | | 7/2000 | Imai | |
| 6,357,939 | B1 | | 3/2002 | Baron | |
| 2001/0038410 | A1 | | 11/2001 | Kubota | |

FOREIGN PATENT DOCUMENTS

EP   0808054 A2   11/1997

(Continued)

OTHER PUBLICATIONS

Derwent Abstract Accession No. 96-404817/41, JP 7-023186 A. (Sony Corp) Jan. 24, 1995.

(Continued)

*Primary Examiner*—Twyler L. Haskins
*Assistant Examiner*—Marcus T Riley

(57) ABSTRACT

A portable printer-scanner device (10) includes a print-head arrangement and a scanner head. A pre-printed image (22) can be scanned by passing the device over it. The printer-scanner is movable by a user relative to a page (20) to print an image (22) stored during the scanning operation.

12 Claims, 5 Drawing Sheets

FOREIGN PATENT DOCUMENTS

| | | |
|---|---|---|
| JP | 63-077740 | 5/1988 |
| JP | 01-174159 | 7/1989 |
| JP | 03-026546 | 3/1991 |
| JP | 05-160972 | 6/1993 |
| JP | 05-177839 | 7/1993 |
| JP | 07-256889 | 10/1995 |
| JP | 09-118048 | 5/1996 |
| JP | 08-331333 | 12/1996 |
| JP | 10-016316 A | 1/1998 |
| JP | 2001-225512 A | 8/2001 |

OTHER PUBLICATIONS

Derwent Abstract Accession No. 99-295942/25, JP 11-099705 A (Brother Kogyo KK) Apr. 13, 1999.

Derwent Abstract Accession No. 2002-063820/09, JP 2001094730 A (Cannon KK) Apr. 6, 2001.

Derwent Abstract Accession No. 2001-340842/36, JP 2001094731 A (Cannon KK) Apr. 6, 2001.

* cited by examiner

MANUALLY OPERABLE PRINTER-SCANNER

CROSS REFERENCE TO RELATED APPLICATION

This Application is a national phase (371) of PCT/AU03/00150, filed on Feb. 12, 2003.

FIELD OF THE INVENTION

The following invention relates to improvements in printer and copier technology, more particularly to drop-on-demand printers and even more particularly to a combined printer-scanner having a print-width drop-on-demand fixed printhead system which can be swiped across a surface by a user to effect both scanning and printing operations.

BACKGROUND

Known prior art printers typically incorporate a supply of print media and employ a print media feed mechanism to transport the print media past the printhead(s) to effect printing onto the print media. It is essential during a printing operation to synchronise the speed of the print media with the printing rate of the printhead(s) to ensure a faithful reproduction of the image being printed. Heretofore, the synchronisation of the print media with the printhead(s) has been relatively simple to accomplish because the print media feed mechanism, including the supply of print media, forms an integral part of the printer or copier. The speed of the print media is therefore known and fixed, as is the speed at which the printhead(s) and print controller operate, with synchronisation between these features being accomplished using simple mechanical features such as gears, stepper motors and the like.

Such features however, in particular the need to have a supply of print media accommodated within the printers, have made these printers larger and heavier than they otherwise need be. Even in more compact printers and copiers employing a monolithic page-width drop-on-demand printhead arrangement, where the printhead is fixed, there is still a need to have a supply of print media and a print media drive mechanism integral to the printer to ensure proper synchronisation between ink ejection and print media transport. These requirements thus limit the minimum printer size possible.

Conventional photocopiers are a bulky, non-portable component. Modem personal computers can perform the basic functions of a bulky photocopier if a computer has a scanner and a printer communicating therewith. Photocopiers suffer the same problems noted above. That is, they must store a supply of print media and provide the necessary media transfer componentry to guide the media past the printing mechanism as copying occurs.

CO-PENDING APPLICATIONS

Various methods, systems and apparatus relating to the present invention are disclosed in the following co-pending applications filed by the applicant or assignee of the present invention simultaneously with the present application:

| | | | | |
|---|---|---|---|---|
| PCT/AU03/00154 | PCT/AU03/00151 | PCT/AU03/00150 | PCT/AU03/00145 | PCT/AU03/00153 |
| PCT/AU03/00152 | PCT/AU03/00168 | PCT/AU03/00169 | PCT/AU03/00170 | PCT/AU03/00162 |
| PCT/AU03/00146 | PCT/AU03/00159 | PCT/AU03/00171 | PCT/AU03/00149 | PCT/AU03/00167 |
| PCT/AU03/00158 | PCT/AU03/00147 | PCT/AU03/00166 | PCT/AU03/00164 | PCT/AU03/00163 |
| PCT/AU03/00165 | PCT/AU03/00160 | PCT/AU03/00157 | PCT/AU03/00148 | PCT/AU03/00156 |
| PCT/AU03/00155 | | | | |

The disclosures of these co-pending applications are incorporated herein by cross-reference.

| RELATED PATENT APPLICATIONS AND PATENTS | | | | |
|---|---|---|---|---|
| 6566858 | 6331946 | 6246970 | 6442525 | PCT/AU01/00141 |
| 09/505951 | PCT/AU01/00139 | 6816968 | 6757832 | PCT/AU01/00140 |
| PCT/AU00/00741 | 6238044 | PCT/AU00/00742 | 6425661 | 6227652 |
| 6213588 | 6213589 | 6231163 | 6247795 | 6394581 |
| 6244691 | 6257704 | 6416168 | 6220694 | 6257705 |
| 6247794 | 6234610 | 6247793 | 6264306 | 6241342 |
| 6247792 | 6264307 | 6254220 | 6234611 | 6302528 |
| 6283582 | 6239821 | 6338547 | 6247796 | 6557977 |
| 6390603 | 6362843 | 6293653 | 6312107 | 6227653 |
| 6234609 | 6238040 | 6188415 | 6227654 | 6209989 |
| 6247791 | 6336710 | 6217153 | 6416167 | 6243113 |
| 6283581 | 6247790 | 6260953 | 6267469 | 6273544 |
| 6309048 | 6420196 | 6443558 | 6439689 | 6378989 |
| 6848181 | 6634735 | PCT/AU98/00550 | PCT/AU00/00095 | 6390605 |
| 6322195 | 6612110 | 6480089 | 6460778 | 6305788 |
| PCT/AU00/00172 | 6426014 | PCT/AU00/00338 | 6364453 | PCT/AU00/00339 |
| 6457795 | PCT/AU00/00581 | 6315399 | PCT/AU00/00580 | 6338548 |
| PCT/AU00/00582 | 6540319 | PCT/AU00/00587 | 6328431 | PCT/AU00/00588 |
| 6328425 | PCT/AU00/00589 | 6991320 | PCT/AU00/00341 | 6595624 |
| PCT/AU00/00340 | PCT/AU00/00749 | 6417757 | PCT/AU01/01332 | 7095309 |
| PCT/AU01/01318 | 6854825 | PCT/AU00/00750 | 7075677 | PCT/AU00/00751 |

-continued

| RELATED PATENT APPLICATIONS AND PATENTS | | | | |
|---|---|---|---|---|
| 6428139 | PCT/AU00/00752 | 6575549 | PCT/AU01/00502 | PCT/AU00/00583 |
| 6383833 | PCT/AU02/01120 | PCT/AU00/00593 | 6464332 | PCT/AU00/00333 |
| PCT/AU00/01513 | 6428142 | PCT/AU00/00590 | 6390591 | PCT/AU00/00591 |
| 7018016 | PCT/AU00/00592 | 6328417 | PCT/AU00/00584 | 6322194 |
| PCT/AU00/00585 | 6382779 | PCT/AU00/00586 | 6629745 | PCT/AU00/01514 |
| 6565193 | PCT/AU00/01515 | 6609786 | PCT/AU00/01516 | 6609787 |
| PCT/AU00/01517 | 6439908 | PCT/AU00/01512 | 6684503 | PCT/AU00/00753 |
| 6755513 | PCT/AU00/00594 | 6409323 | PCT/AU00/00595 | 6281912 |
| PCT/AU00/00596 | 6604810 | PCT/AU00/00597 | 6318920 | PCT/AU00/00598 |
| 6488422 | PCT/AU01/01321 | 6655786 | PCT/AU01/01322 | 6457810 |
| PCT/AU01/01323 | 6485135 | PCT/AU00/00516 | 6795215 | PCT/AU00/00517 |
| 7154638 | PCT/AU00/00511 | 6859289 | PCT/AU00/00754 | 6977751 |
| PCT/AU00/00755 | 6398332 | PCT/AU00/00756 | 6394573 | PCT/AU00/00757 |
| 6622923 | | | | |

SUMMARY OF THE INVENTION

According to a first aspect of the present invention there is disclosed a combined printer-scanner adapted to be movable by a user relative to a surface and being operable in a scanning mode and a printing mode, the printer-scanner comprising:

a speed sensor adapted to measure the speed at which the printer-scanner is moved relative to the surface by the user;

a scanning device synchronised with the speed sensor and being adapted, when the printer-scanner is in scanning mode, to capture image data representative of an image disposed on the surface as the printer-scanner is moved relative to the surface by the user;

a memory adapted to store the image data;

a printhead arrangement synchronised with the speed sensor and being adapted, when the printer-scanner is in printing mode, to effect printing of the image data onto a print media as the printer-scanner is moved relative to the print media by the user; and a housing adapted to house the speed sensor, the scanning device, the memory and the printhead arrangement Preferably, the printhead arrangement comprises a plurality of ink ejection nozzles.

Preferably, the printer-scanner further comprises a print controller adapted to:
(a) convert the image data stored in the memory into a plurality of drop ejection control signals;
(b) receive speed data from the speed sensor, the speed data being indicative of the speed at which the printer-scanner is moved relative to the print media by the user, and
(c) operate the ink ejection nozzles in the printhead arrangement in accordance with the drop ejection control signals at a rate determined using the speed data, to thereby effect printing of the image data onto the print media.

Preferably, the speed sensor comprises an optical encoder wheel adapted to operate in contact with the surface and to rotate as the printer-scanner traverses the surface. More preferably, the optical encoder wheel comprises:

a series of circumferentially spaced markings; and an optical sensor for detecting the markings as the markings pass the optical sensor during rotation of the optical encoder wheel.

Preferably, the printer-scanner further comprises a power supply housed within the housing, the power supply comprising a cartridge in which there is disposed a battery and an ink supply, the cartridge being removable from the housing to allow removal and replacement of the battery and the ink supply substantially simultaneously.

Preferably, the printer-scanner further comprises:

a capping arrangement moveable between a capped position in which the capping arrangement substantially obstructs the ejection of ink from the ink ejection nozzles and an uncapped position in which the capping arrangement does not substantially obstruct the ejection of ink from the ink ejection nozzles; and a capping actuator disposed on the printer-scanner so as to be operable by a user as the user moves the printhead arrangement relative to the print media.

Preferably, the printer-scanner further comprises a biasing member adapted to bias the capping arrangement towards the capped position.

Preferably, the capping arrangement comprises a mounting portion pivotally mounted on the printer and a capping arm extending substantially perpendicularly from the mounting portion to a distal end, the distal end lying adjacent the ink ejection nozzles to substantially obstruct ink ejection from the ink ejection nozzles when the capping arrangement is mounted on the printer-scanner and is in the capped position.

Preferably, the printer-scanner further comprises a finger pad formed on the mounting portion of the capping arrangement.

Preferably, the memory is further adapted to store printable information and the printhead arrangement is adapted to effect printing of the printable information onto the print media as the printer-scanner is moved relative to the print media by the user.

Preferably, the printable information is received from a source external to the printer-scanner via a communications receiver. More preferably, the communications receiver is an infra-red receiver, the printer-scanner further comprising an infra-red window through which infra-red signals may pass to the infra-red receiver.

Preferably, the printer-scanner further comprises an ink supply adapted to store ink and to supply the ink to the printhead arrangement.

BRIEF DESCRIPTION OF THE DRAWINGS

A preferred form of the present invention will now be described by way of example only with reference to the accompanying drawings wherein.

DESCRIPTION OF THE PREFERRED EMBODIMENT

Figure 1:
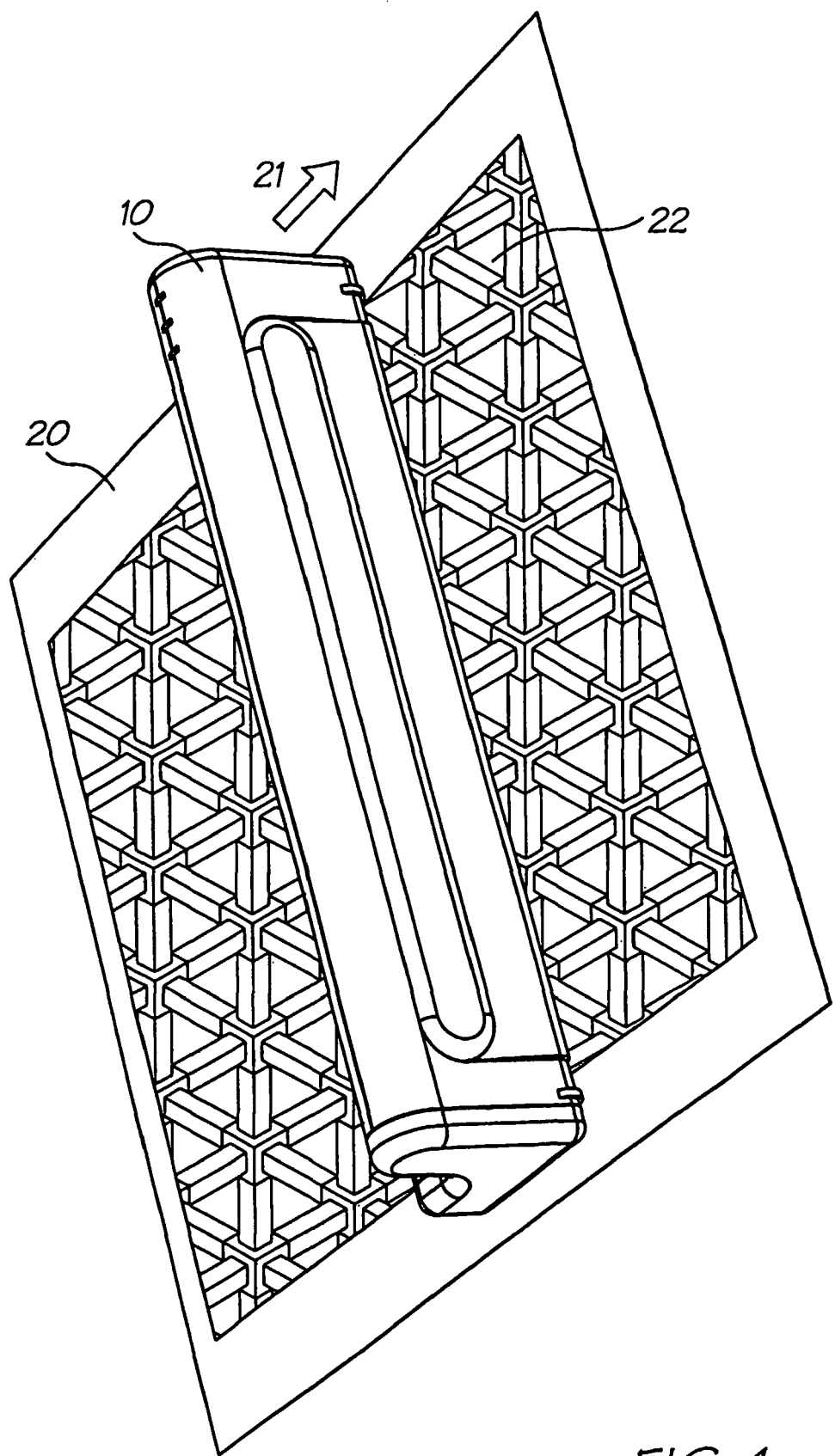
FIG. 1 is a perspective view of a printer-scanner shown in use to scan an image from a page.

Referring to the figures, a preferred embodiment of the printer-scanner of the present invention is shown generally at 10 in FIG. 1. In this figure, the printer-scanner 10, under guidance of a user, traverses a page 20 in the direction of the arrow 21 to scan an image 22 from the page 20.

Figure 2:
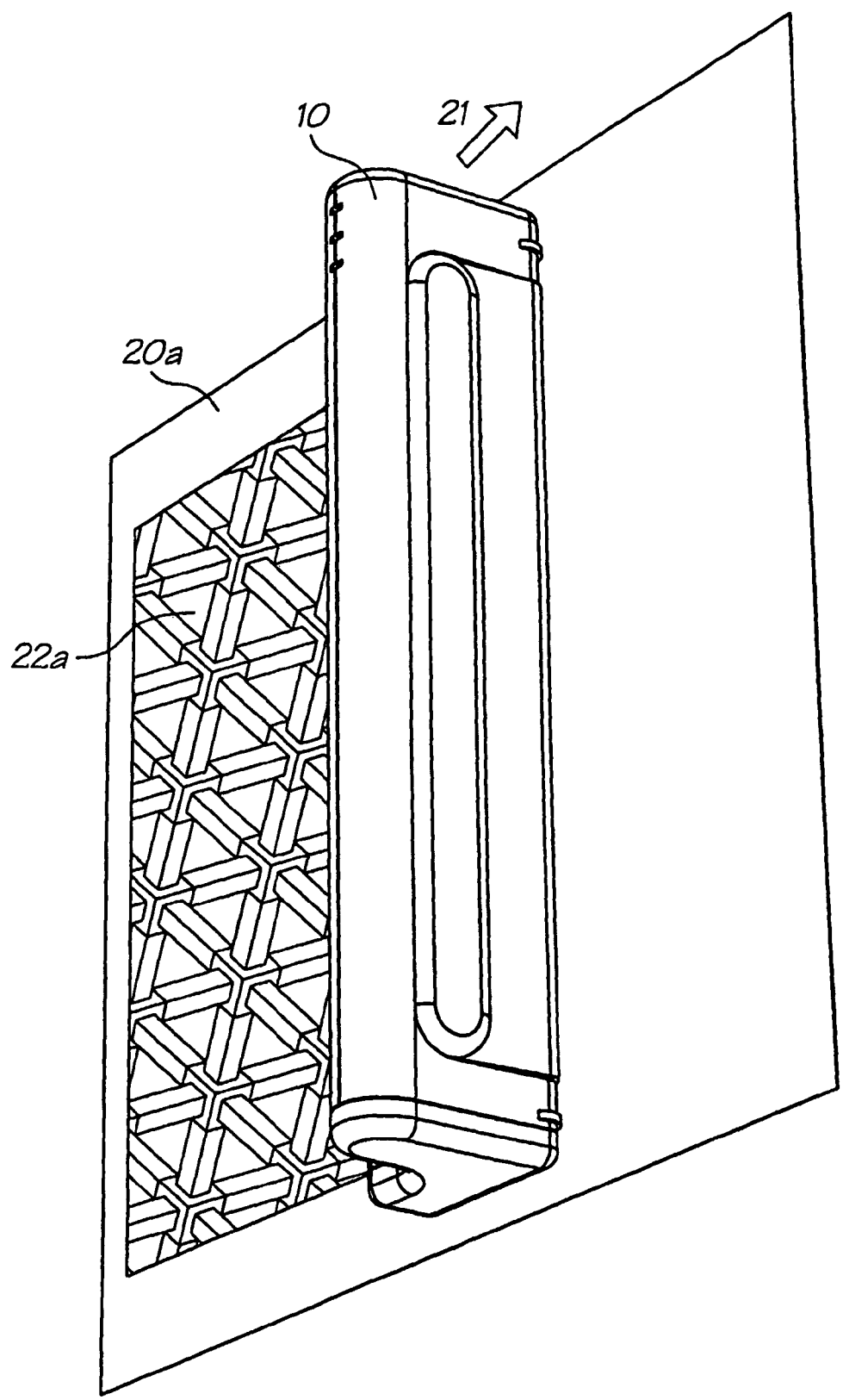
FIG. 2 is a perspective view of the printer-scanner of FIG. 1 in use in a printing operation.

As shown in FIG. 2, the printer-scanner 10 also can be guided by a user to traverse a page 20A in the direction of arrow 21 to print an image 22A on the page 20A. This printed image can be a reproduction of image 22 or could be any other image depending upon the way in which the printer-scanner is used.

Figure 3:
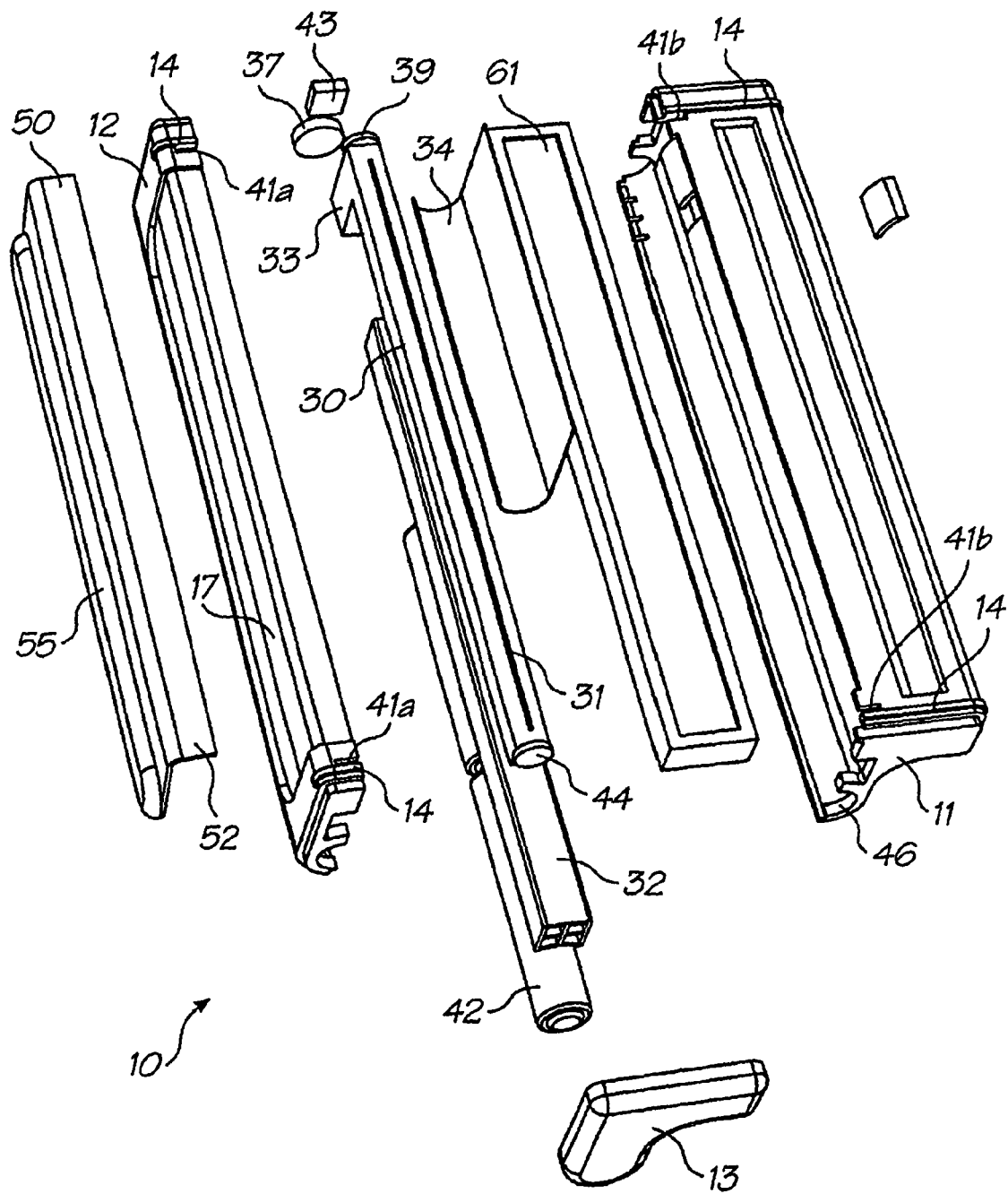
FIG. 3 is an exploded view of the printer-scanner of FIGS. 1 and 2.

An exploded view of the printer-scanner 10 is shown in FIG. 3. The printer-scanner 10 includes a lower moulding 11, an upper moulding 12 and a removable end cap 13 each of which may be formed of any suitable plastics, metal or similar material.

The upper and lower mouldings each include media slides 14 formed at each end of the mouldings on the bottom surface thereof. The slides 14 protrude from the bottom surface of the mouldings and serve to elevate the printer-scanner as the printer-scanner traverses the print media. This results in minimal friction between the printhead and print media and prevents contact between the printer-scanner and freshly printed ink which could otherwise disturb the printed image.

Figure 5:
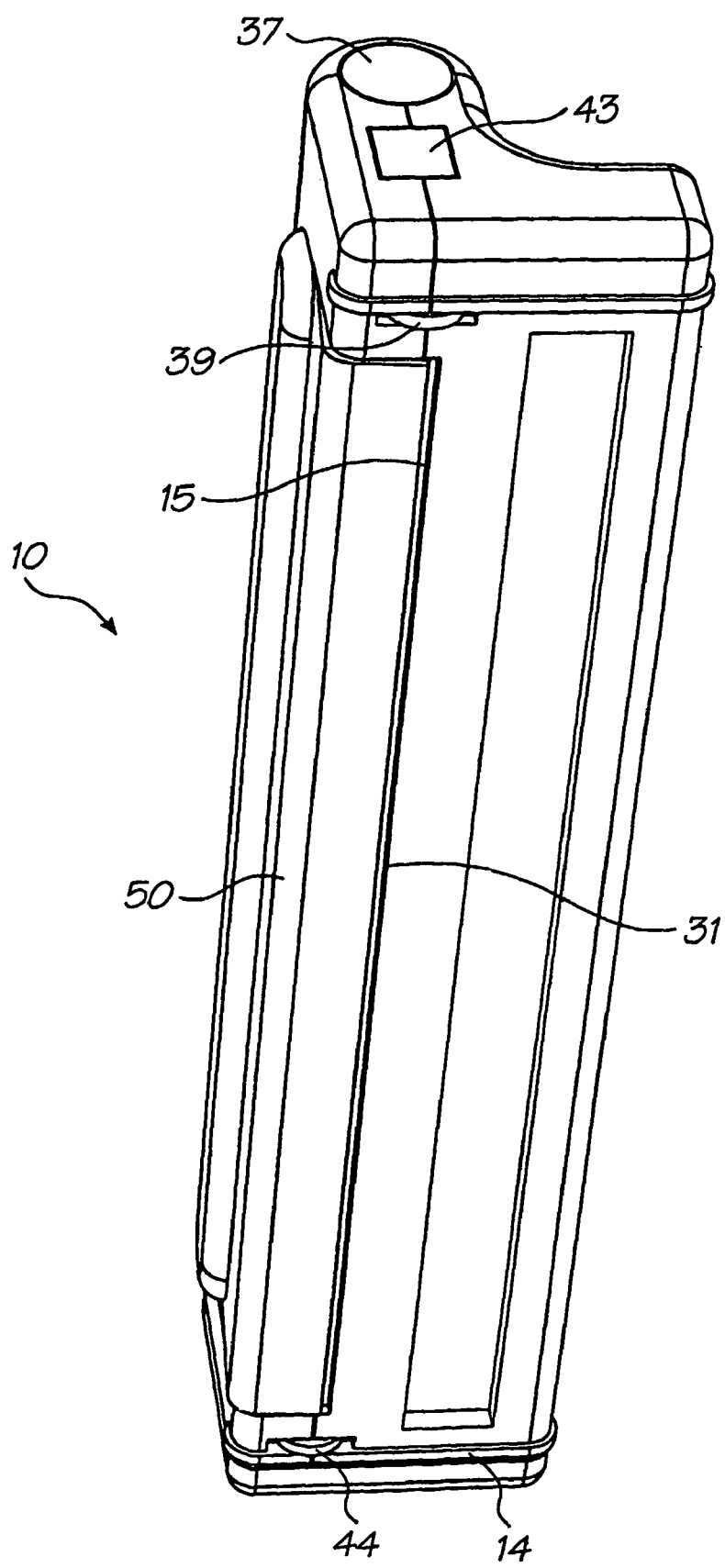
FIG. 5 is an inverted perspective view of the printer-scanner.

When joined, the upper and lower mouldings reveal an ink ejection slot 15 (FIG. 5) through which ink is ejected during printing. A capping device 50, preferably of metal is received in a recess 17 formed in the upper moulding 12. The capping device 50, pivots about a pivot point from a capped position in which a capping arm 52 of the capping device 50 blocks the ink ejection slot 15 to an uncapped position wherein ink ejection is unrestricted. Operation of the capping device 50 occurs using a finger pad 55 formed integrally with the capper.

Internally, the printer-scanner 10 includes a printhead module 30 in which is disposed a plurality of ink distribution channels leading to an array of ink ejection nozzles 31 which are aligned with the ink ejection slot 15 formed between the upper and lower mouldings 12, 11. An ink supply cartridge 32 stores inks, preferably in four colors namely cyan, magenta, yellow and black, to provide for full color printing. Alternatively, or in addition, infra-red ink may be provided. The ink cartridge 32 supplies ink to the ink distribution channels of the printhead module 30 through an ink connector 33.

Any one of a number of known printhead modules and ink supply systems may be suitable for use with the present invention and thus further description of such features is omitted here. Details of printhead modules and ink supply systems suitable for use with the invention can be found in the co-pending applications listed at the start of this specification.

A scanner head 61 is incorporated into the lower molding 11 and receives power and transmits signal data via the flexible printed circuit board 34. The scanner head 61 can be any conventional or new scanner head suitable for portable handheld scanning.

A print controller 36 (not shown) includes a microprocessor that converts image data stored in a printer-scanner memory into a sequence of electrical "drop ejection" signals. The signals are communicated to the printhead module 30 in a known manner during a print operation to cause selective ejection of ink from the ink ejection nozzles 31.

The printer-scanner memory would typically receive image data via the flexible printed circuit board 34 from the scanner head 61.

The print controller 36 can also communicate with external devices to receive print instructions, in particular digital image data. In the embodiment shown, digital image data may be provided to the print controller 36 as an infra-red (IR) signal through an IR receiver window 37 formed in one end panel of the printer-scanner 10. The IR receiver 37 which is electrically connected to the print controller microprocessor 36 receives the data which is then stored in the memory. In alternative embodiments (not shown), the print controller microprocessor may communicate through any other suitable connection for example, hard wire connections to other electronic devices (such as computers, scanners, copiers, digital cameras and the like), wireless telecommunications (such as WAP and the like) or through a plug and socket connection or data port. Other information, for example print control instructions, may also be provided to the printer-scanner from external devices using the above systems. In a further embodiment, the print controller microprocessor may have its own graphics generating capabilities.

The upper and lower mouldings provide a recess in which to receive batteries 42, for example two 1.5 V "AAA" batteries. A flexible printed circuit board (PCB) 34 has busbars (not shown) thereon that convey power from the batteries 42 to the printhead module 30, the print controller microprocessor 36 and any other powered components.

A power switch 43 formed in an end panel of the printer-scanner 10 is operated by a user to actuate the printer-scanner between powered and unpowered modes.

The batteries 42 are removable from the printer-scanner 10 through an aperture 46 formed between the upper and lower mouldings. The ink cartridge may be removed and replaced through a similar aperture 47. As illustrated in FIG. 3, the end cap 13 is first removed from the printer-scanner 10 to reveal the apertures 46, 47 after which the batteries and/or ink cartridge may be replaced. In a further embodiment not illustrated here, the batteries and ink cartridge may be provided as an integral unit within a removable housing with only one aperture being formed in the end of the printer-scanner 10 to receive the housing.

Figure 4:
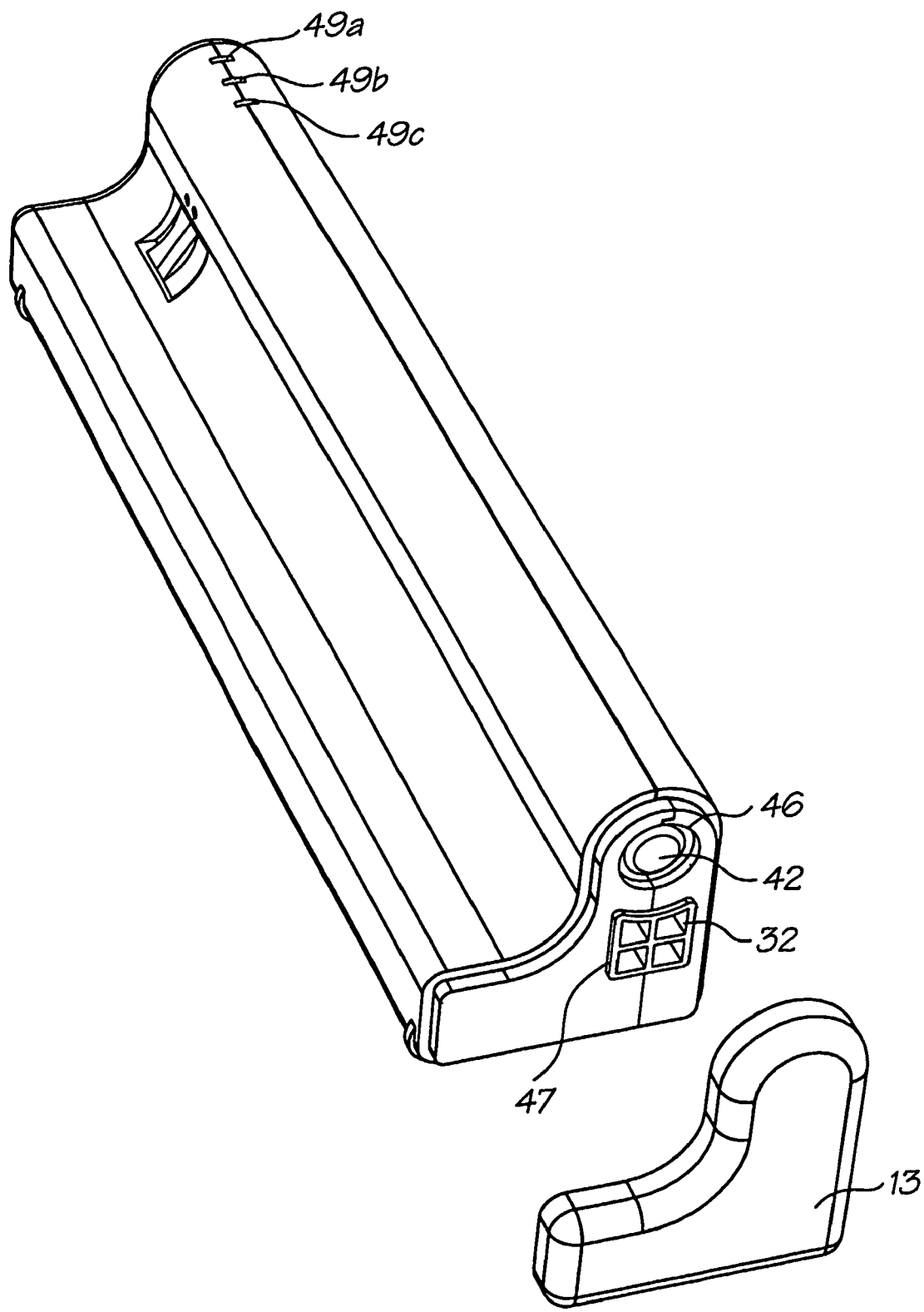
FIG. 4 is a perspective end view of the printer-scanner.

A plurality of status indicating light emitting diodes (LEDs) 49a, 49b, 49c (FIG. 4) are electrically connected to the microprocessor and are disposed in an outer surface of the printer-scanner 10. The separate LEDs can be used for indicating error conditions such as low battery, low ink or general printer-scanner operation error conditions as well as a general printer-scanner ON/OFF condition.

To form the scanning operation, a user first switches the device on using the power switch 43. A "scan" button can then be depressed or the device manipulated in some other way so as to switch it into a scanning mode. It can then be drawn over an image as shown in FIG. 1 such that the scanning head 61 scans the pre-printed image 22 for storage in an on-board memory chip or the like.

To perform printing, a user first actuates the capping device 50, in a manner described below, to expose the printhead chip 31 (FIG. 5) to the print media. The print media may be any suitable textile for receiving the type of ink stored in the printer-scanner and may include inter alia paper, cardboard, wood, fabric and plastics. The printer-scanner 10 may include further control buttons depressed by the user to initiate printing, i.e. to commence the ejection of ink from the printhead under the control of the print control microprocessor. Alternatively, actuation of the capper 16 may be detected as a signal that the user is ready for the printing to commence. The user then traverses the print media 20 with the printer-scanner 10 as illustrated in FIG. 2.

To control the printing rate, the printer-scanner 10 includes an optical encoder wheel 39 (FIG. 3) attached to the printhead module 30 at one end thereof. The optical encoder wheel 39 is received in slots 41a, 41b formed in the upper and lower mouldings respectively and extends from the mouldings to the point where the rim of the wheel 39 is level with the media slides 14 (see FIG. 5). Circumferentially spaced markings on the optical encoder wheel 39 are read by an optical sensor as the wheel 39 rotates.

The optical sensor includes a light source, eg. an LED, and a photo-detector that produces an electrical response dependant on the amount of light incident upon the detector. The light reflection characteristics of the encoder wheel 39 vary between the marked and un-marked areas and thus as the markings rotate past the detector, a change in the detector response occurs. The frequency at which the detector responds provides a measurement of the speed at which the encoder wheel is rotating. The detector response is communicated to the print control microprocessor 36 which uses the signal to calculate the speed at which the printhead module is being moved across the print media. The print controller then synchronises the rate at which the drop ejection control signals are passed to the ink ejection nozzles with the measured speed at which the printer-scanner is moving. The printer-scanner 10 is therefore able to ensure appropriate print dot spacing of successive lines of print and thus create a faithful reproduction of the printed image even though the printer-scanner does not control the speed at which the print media moves relative to the printhead.

Furthermore, if the number of markings on the encoder wheel 39 is high enough, the microprocessor 36 is able to quickly adapt to the variations in the speed at which a user may move the printer-scanner across the print media thereby achieving a higher quality image.

In a similar way, the optical encoder wheel 39 may be functionally associated with the scanner head 61 if necessary to synchronise the rate of scanning with the rate at which the device is drawn over the pre-printed image.

An idler wheel 44 is attached to the opposite end of the printhead module 30 to allow stability and directional control of the printer-scanner. A shaft may connect the idler wheel 44 with the encoder wheel 39 to synchronise the rotation speeds of each wheel and therefore maintain a correct and straight-line tracking of the device over a page.

The optical encoder wheel 39 or idler wheel 44 may have a speed limiter such as a friction clutch that prevents a user from moving the printer-scanner along the print media at a rate faster than the maximum rate of operation of the printhead module 30. Furthermore, either or both wheels may have a system such as a ratchet for preventing the printer-scanner from being moved in reverse to the direction of printing.

Operation of the capping mechanism 50 is described in our co-pending application having docket No. AP44 filed concurrently herewith and entitled "Printer with Capping Device".

A contact sensor (not shown) may detect when the capper 50 is moved to the uncapped position and communicate the state of the capper to the print control microprocessor 36 so that printing is only attempted when the capper 50 is in the uncapped position.

The printer-scanner 10 of the present invention may include keys for controlling the microprocessor to perform such printer-scanner operations as downloading image data from an external device, resetting an incomplete print operation so that the printer-scanner commences printing at the start of an image and the like. Alternatively, these functions may be communicated to the printer-scanner through the IR data port described previously.

I claim:

1. A combined printer-scanner adapted to be moveable by a user relative to a surface and being operable in a scanning mode and a printing mode, the printer-scanner comprising:

a speed sensor adapted to measure the speed at which the printer-scanner is moved relative to the surface by the user;

a scanning device synchronised with the speed sensor and being adapted, when the printer-scanner is in scanning mode, to capture image data representative of an image disposed on the surface as the printer-scanner is moved relative to the surface by the user;

a memory adapted to store the image data;

a printhead arrangement synchronised with the speed sensor and being adapted, when the printer-scanner is in printing mode, to effect printing of the image data onto a print media as the printer-scanner is moved relative to the print media by the user, the printhead arrangement comprise a plurality of ink ejection nozzles;

a print controller adapted to:

convert the image data stored in the memory into a plurality of drop ejection control signals;

receive speed data from the speed sensor, the speed data being indicative of the speed at which the printer-scanner is moved relative to the print media by the user; and operate the ink ejection nozzles in the printhead arrangement in accordance with the drop ejection control signals at a rate determined using the speed data, to thereby effect printing of the image data onto the print media; and a housing adapted to house the speed sensor, the scanning device, the memory, the print controller and the printhead arrangement;

a capping arrangement moveable between capped and uncapped positions to thereby selectively cap the printhead, the capping arrangement being movable between a capped position in which the capping arrangement substantially obstructs the ejection of ink from the ink ejection nozzle and an un-capped position in which the capping arrangement dose not substantially obstruct the ejection of ink from the ink ejection nozzles; and a capping actuator disposed on the printer-scanner so as to be operable by a user as the user moves the printhead arrangement relative to the print media; and a contact sensor to sense when the capping arrangement is moved to the un-capped position, wherein the contact sensor transfers a signal to the print controller so that printing occurs when the capping arrangement is sensed to be in the un-capped position.

2. The printer-scanner of claim 1 wherein the printhead arrangement comprises a plurality of ink ejection nozzles.

3. The printer-scanner of claim 1 wherein the speed sensor comprises an optical encoder wheel adapted to operate in contact with the surface and to rotate as the printer-scanner traverses the surface.

4. The printer-scanner of claim 3 wherein the optical encoder wheel comprises:

a series of circumferentially spaced markings; and an optical sensor for detecting the markings as the markings pass the optical sensor during rotation of the optical encoder wheel.

5. The printer-scanner of claim 1 further comprises a power supply housed within the housing, the power supply comprising a cartridge in which there is disposed a battery and an ink supply, the cartridge being removable from the housing to allow removal and replacement of the battery and the ink supply substantially simultaneously.

6. The printer-scanner of claim 1 wherein the capping arrangement comprises a mounting portion pivotally mounted on the printer and a capping arm extending substantially perpendicularly from the mounting portion to a distal end, the distal end lying adjacent the ink ejection nozzles to substantially obstruct ink ejection from the ink ejection nozzles when the capping arrangement is mounted on the printer-scanner and is in the capped position.

7. The printer-scanner of claim 6 farther comprising a finger pad formed on the mounting portion of the capping arrangement.

8. The printer-scanner of claim 1 wherein the memory is further adapted to store printable information and the printhead arrangement is adapted to effect printing of the printable information onto the print media as the printer-scanner is moved relative to the print media by the user.

9. The printer-scanner of claim 8 wherein the printable information is received from a source external to the printer-scanner via a communications receiver.

10. The printer-scanner of claim 9 wherein the communications receiver is an infra-red receiver, the printer-scanner further comprising an infra-red window through which infra-red signals may pass to the infra-red receiver.

11. The printer-scanner of claim 1 further comprising an ink supply adapted to store ink and to supply the ink to the printhead arrangement.

12. The printer-scanner of claim 1, wherein the printer-scanner includes a ratchet arrangement to restrict reverse movement of the printer-scanner over the surface.

* * * * *